(12) United States Patent
Dessenberger, Jr.

(10) Patent No.: US 6,279,971 B1
(45) Date of Patent: Aug. 28, 2001

(54) LATCH WITH SENSOR

(75) Inventor: Arthur W. Dessenberger, Jr., Tehachapi, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 09/412,296

(22) Filed: Oct. 5, 1999

(51) Int. Cl.$^7$ ...................................................... E05C 5/00
(52) U.S. Cl. ............................. 292/113; 292/DIG. 31; 244/129.4
(58) Field of Search ........................... 292/113, DIG. 31, 292/DIG. 65, 256, 69, DIG. 49; 244/129.4

(56) References Cited

U.S. PATENT DOCUMENTS

| | | |
|---|---|---|
| 2,712,955 | 7/1955 | Andrews . |
| 3,194,595 * | 7/1965 | Wheeler ................................ 292/113 |
| 3,259,412 * | 7/1966 | Wheeler ................................ 292/113 |
| 3,347,578 * | 10/1967 | Sheehan ................................ 292/113 |
| 4,613,099 * | 9/1986 | Smith ................................ 244/53 R |
| 4,759,574 * | 7/1988 | James ................................ 292/113 |
| 5,152,559 | 10/1992 | Henrichs . |
| 5,518,206 * | 5/1996 | Arnold ............................... 244/129.4 |
| 5,620,212 | 4/1997 | Bourne et al. . |
| 6,042,156 * | 3/2000 | Jackson .................................. 292/26 |
| 6,148,607 * | 11/2000 | Baudu ................................. 60/226.2 |

OTHER PUBLICATIONS

Hartwell Corporation Engineering Drawing, Latch Assy Cowl Panel, H245 (3 pages).

\* cited by examiner

*Primary Examiner*—Gary Estremsky
(74) *Attorney, Agent, or Firm*—Barnes & Thornburg (57) ABSTRACT

Disclosed is a latch for releasably engaging a keeper to secure two members, such as, aircraft cowlings, to one another. The latch includes a handle moveable between closed and open positions and a hook pivotally connected to the handle for engagement with the keeper. When the handle is in the closed position, the hook engages the keeper to secure the members. When the handle is in the open position, the hook is disengaged from the keeper and the members are no longer secured. The latch includes a sensor pivotally mounted to the handle. The sensor provides a visual indication, via the position of the handle, whether the hook has engaged the keeper. If the hook does not engage the keeper, the sensor prevents the handle from closing, providing a visual indication that the latch has not closed.

10 Claims, 7 Drawing Sheets

LATCH WITH SENSOR

BACKGROUND OF THE INVENTION

1. Field of the Invention

This invention relates to the mechanical arts. In particular, this invention relates to a latch with sensor that releasably engages a keeper, for securing two members, typically aircraft panels, to one another.

2. Discussion of the Related Art

Various types of latches join and lock aircraft panels, such as, aircraft cowlings, to one another. A typical latch includes a hook mounted to one aircraft panel that engages a keeper mounted to another aircraft panel. Further, the latch includes a handle to actuate the hook. The latch secures the aircraft panels to one another when the handle is in the closed position and the hook is engaged with the keeper. When the handle is in the closed position, the handle should be flush with the exterior surface of the aircraft panel to provide a visual indication that the latch is closed.

A problem with these latches is that, even when the handle is in the closed position, the hook may not be engaged with the keeper. For example, the hook or the keeper could be missing or broken. Unfortunately, the ground crew inspecting the aircraft cannot visually verify whether the hook has engaged the keeper to ensure the latch is properly closed. Various types of special devices, such as, a feeler mechanism, have been utilized with these types of latches to provide a visual indication of the hook and keeper engagement. Feeler mechanisms are typically mounted to the hook and detect whether the hook has engaged the keeper. If the hook does not engage the keeper, the feeler mechanism is translated to a blocking position which prevents the handle from closing. Thus, the handle is not flush with the exterior surface of the aircraft panel providing a visual flag that the latch is not properly closed. On the other hand, if the hook does engage the keeper, the feeler mechanism is translated to an unblocking position allowing the handle to close.

Figure 1A:
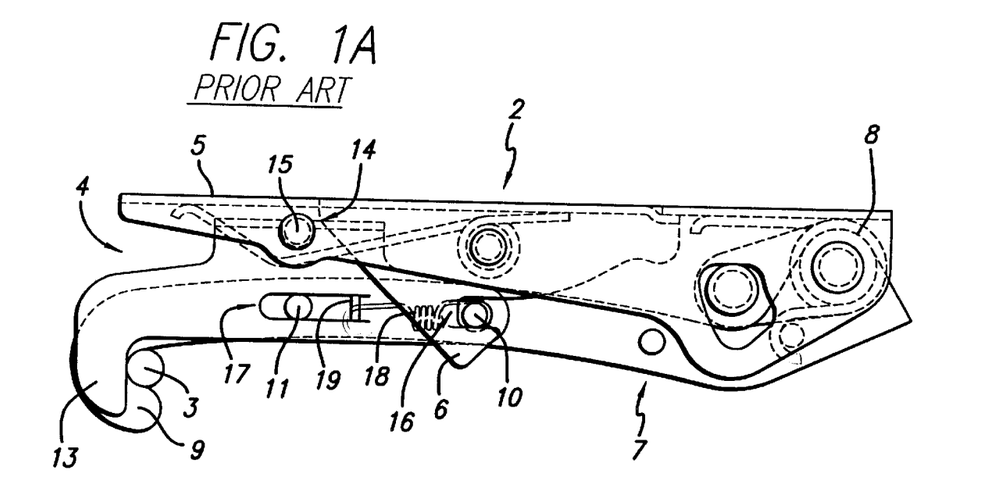
FIG. 1A is a side view of a prior art latch properly engaged to a keeper.

FIG. 1A is a side view of a prior art latch 2 properly engaged to a keeper 3, particularly illustrating a feeler mechanism 4 in the unblocking position. The latch includes a handle 5, a spring 8, a trigger lock 6, pins 10 and 11, and a hook 7. The hook includes a hooked end 9 for engaging the keeper. The handle is moveable between a closed position and an open position, with the spring biasing the handle towards the open position.

The feeler mechanism 4 fits over the hook 7 and slides relative to the hook. The feeler mechanism is generally U-shaped in cross-section and has a pair of hooked portions 13. The hooked portions align with the hooked end 9 of the hook. The feeler mechanism includes a notch 14 that cooperates with a handle pin 15 mounted to the handle 5. The feeler mechanism also includes a pair of slots 16 and 17 that align with and enclose the pins 10 and 11, respectively, which extend transversely through the hook. The slots allow the feeler mechanism to slide along the hook. The feeler mechanism further includes a pair of the secondary springs 18 and a pair of posts 19 that extend perpendicularly from the feeler mechanism. The secondary springs couple each pin with each post, respectively. The secondary springs bias the feeler mechanism towards the blocking position.

When the latch 2 is properly closed, the hooked end 9 and the hooked portions 13 engage the keeper 3 resulting in the feeler mechanism 4 sliding longitudinally relative to the hook 7 opposing the spring action of the secondary springs 18. The feeler mechanism slides to the unblocking position such that the notch 14 aligns with the handle pin 15. Then the handle pin falls into the notch allowing the trigger lock 6 to engage the protruding ends of the pin 10 and allowing the handle 5 to pivot to the closed position. In the closed position, the handle is flush with the exterior surface of the aircraft panel. Therefore, the feeler mechanism allows the handle to close, providing a visual indication that the hook has engaged the keeper and that the latch is properly closed.

Figure 1B:
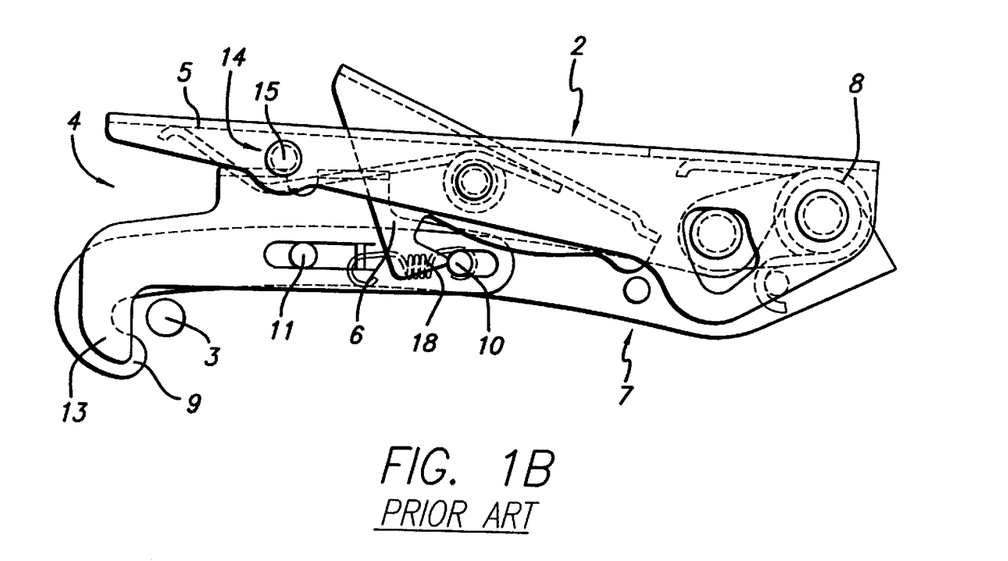
FIG. 1B is a side view of the prior art latch disengaged from the keeper.

FIG. 1B is a side view of the prior art latch 2 disengaged from the keeper 3 illustrating the feeler mechanism 4 in the blocking position. When the hooked end 9 and the hooked portions 13 do not engage the keeper, the feeler mechanism does not slide longitudinally relative to the hook. The secondary springs 18 then bias the feeler mechanism to the blocking position. In the blocking position, the handle pin 15 does not align with the notch 14, thus preventing the handle pin from falling into the notch. Therefore, the trigger lock 6 cannot engage the pin 10 and the handle 5 cannot pivot to the closed position. The spring action of the spring 8 then pivots the handle away from the exterior surface of the aircraft panel, towards the open position, such that the handle is angled relative to the aircraft panel. Therefore, the feeler mechanism, through the position of the handle, provides a visual indication that the hook has not engaged the keeper and that the latch is not properly closed.

Unfortunately, the prior art latch with the feeler mechanism suffers from certain disadvantages. Because pins extend through the hook to accommodate the feeler mechanism, the flight load capabilities of the latch are limited. Furthermore, the feeler mechanism is complex and uses many different parts. The feeler mechanism requires a specialized form fitting sheet metal part having many different surfaces and slots, along with secondary springs, all of which must cooperate with existing structures on the latch. For example, the notch must cooperate with the handle pin. This results in a latch that is relatively heavy and complex.

In view of the above, it should be appreciated that there is a need for a latch with sensor that provides a visual indication of the engagement of the hook and keeper, is mounted independently of the hook, and that is relatively light in weight and simple in design. The present invention satisfies these and other needs and provides further related advantages.

SUMMARY OF THE INVENTION

The invention resides in a latch with sensor that provides advantages over known latches in that it provides a visual indication of the engagement of the hook and keeper, is mounted independently of the hook, and is relatively light in weight and simple in design.

The latch releasably engages a keeper for securing two members to one another. The latch includes a handle moveable between a closed position and an open position and a hook pivotally connected to the handle for engagement with the keeper. The latch includes a trigger lock pivotally mounted to the handle for engagement with the hook so that when the handle is in the closed position, the trigger lock engages the hook, and when the handle is in the open position, the trigger lock is disengaged from the hook. To close the latch, the handle is rotated to the closed position and the hook engages the keeper securing the two members to one another. On the other hand, to open the latch, the trigger lock is disengaged from the hook and the handle is rotated to the open position such that the hook disengages from the keeper.

The latch includes a sensor that provides a visual indication, via the position of the handle, of the state of engagement of the hook and keeper. The sensor is mounted to the handle for movement between a blocking position and an unblocking position. The sensor has a sensing end for engagement with the keeper and a blocking end for engagement with the trigger lock. In some embodiments, the sensor is pivotally mounted to the handle and includes a blocking wall, defining the blocking end, and two depending legs defining the sensing end. If the handle is rotated towards the closed position and the depending legs do not engage the keeper, the sensor moves to the blocking position such that the blocking wall engages the trigger lock thereby preventing the trigger lock from engaging the hook and the handle from closing. The handle then pivots towards the open position providing a visual indication that the hook has not engaged the keeper and the latch is not properly closed. On the other hand, when the depending legs engage the keeper, the sensor moves to the unblocking position such that the blocking wall is moved away from the trigger lock thereby allowing the trigger lock to engage the hook and the handle to close.

Accordingly, the latch provides a visual flag, via the position of the handle, indicating whether the latch has closed properly. An additional advantage of the latch is that the sensor is pivotally mounted to the handle, instead of the hook, so that the sensor has no effect on the flight load capabilities of latch. Thus, the latch can accommodate larger flight loads. Also, the sensor is relatively light in weight and simple in design.

Other features and advantages of the present invention will be set forth in part in the description which follows and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DESCRIPTION OF THE PREFERRED EMBODIMENTS

Figure 2:
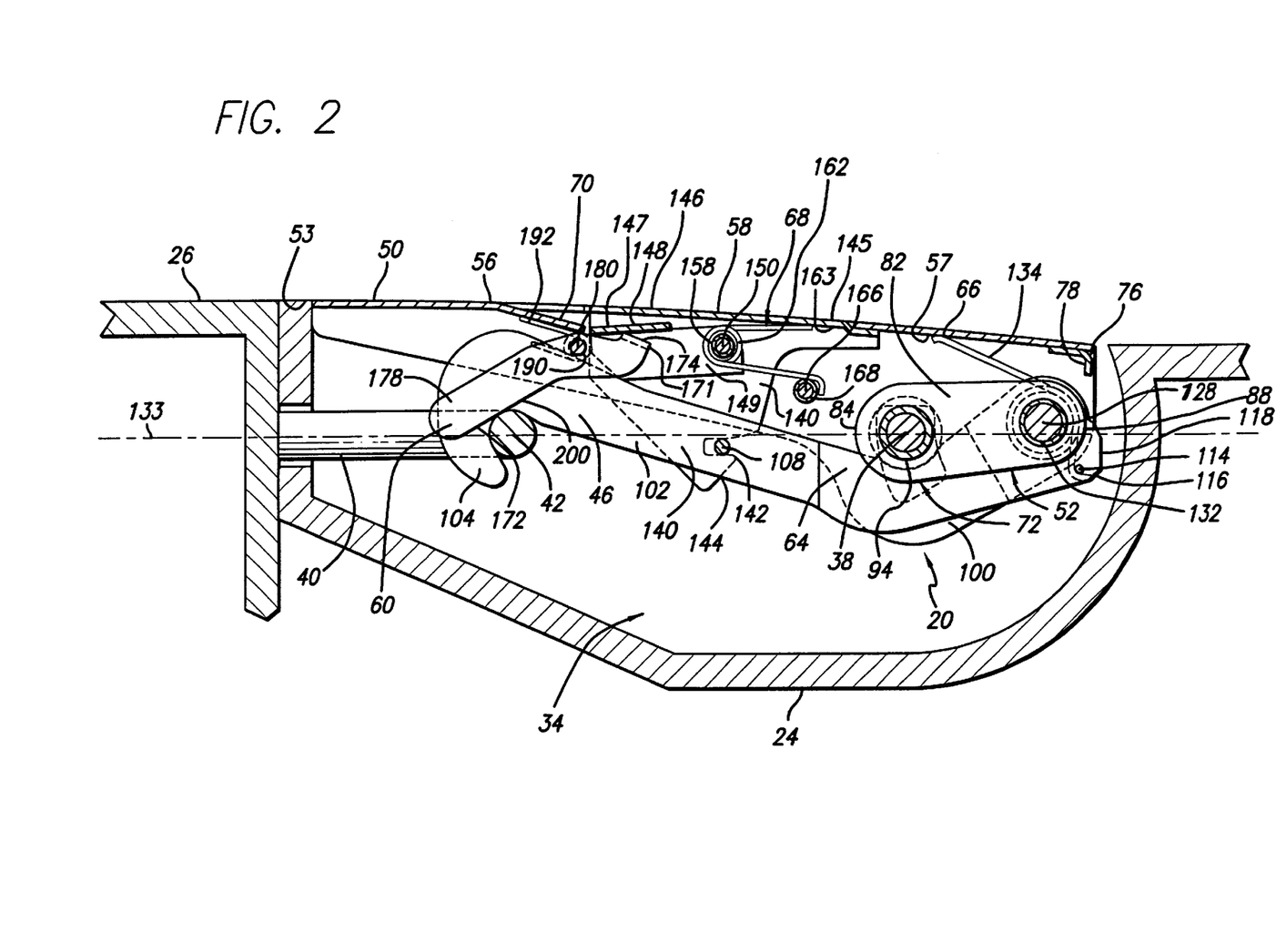
FIG. 2 is a sectional view of a latch with sensor according to the invention engaged to a keeper and illustrates the latch in a closed position with a sensor in an unblocking position.

The latch with sensor of the invention releasably engages a keeper for securing two members to one another. As shown in the exemplary drawings, and with particular reference to FIG. 2, the invention is embodied in a latch 20 for securing a first aircraft cowling 24 to a second aircraft cowling 26. The latch fits within an aperture 34 formed in the first cowling and includes a handle 50 for actuating a hook 46. The handle is moveable between open and closed positions for pivoting the hook into and out of engagement with a keeper 40. FIG. 2 shows the hook engaged to the keeper. The keeper, constructed as a clevis pin, is mounted to the second cowling and includes a bar 42 for receipt of the hook. When the latch is properly closed, the hook engages the bar, securing the first and second cowlings together, and the exterior surface 56 of the handle is flush with the exterior surface 53 of the first cowling.

Figure 3:
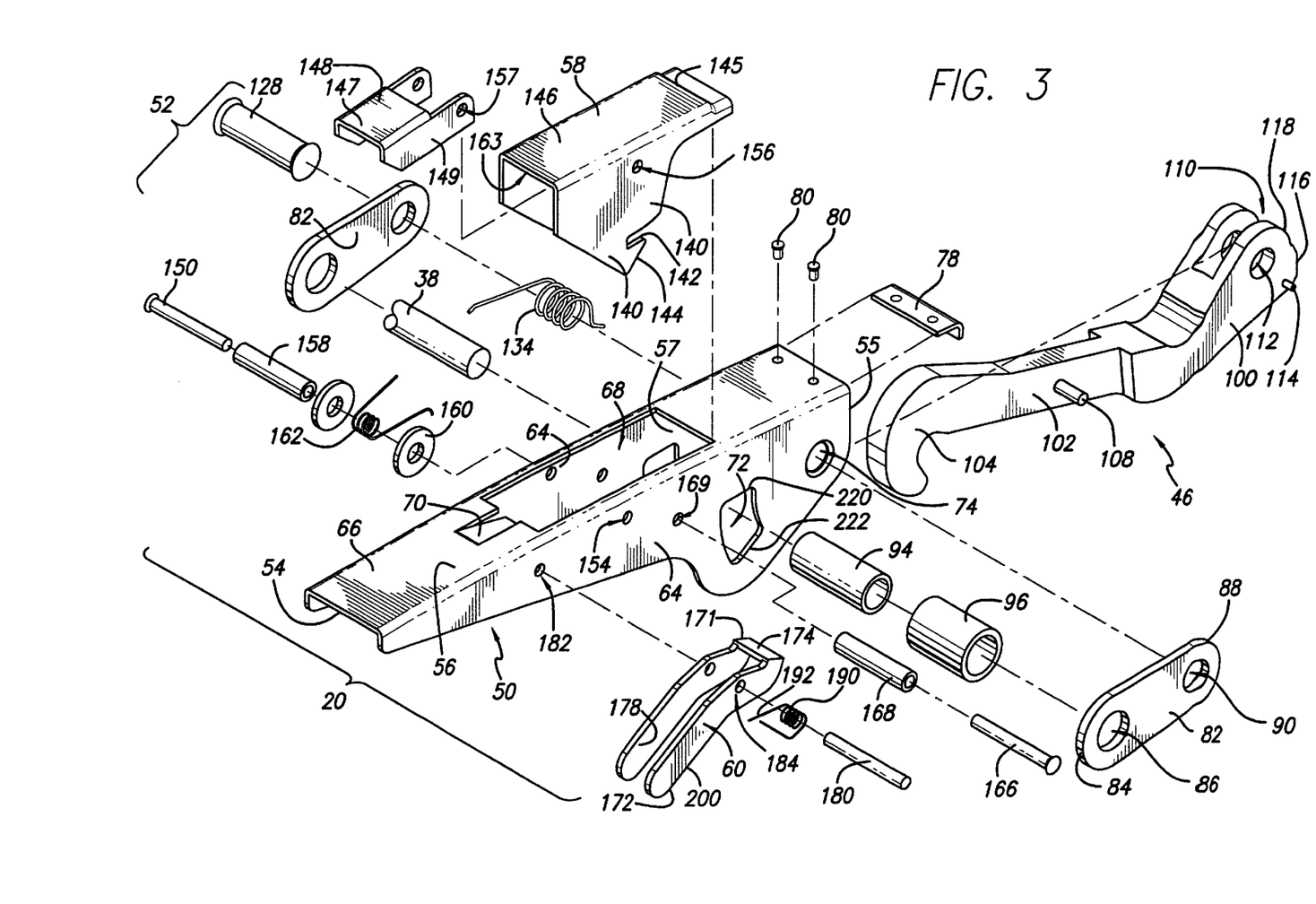
FIG. 3 is an exploded view of the latch of FIG. 2.

An exploded view of the latch 20 is shown in FIG. 3. It can be seen that the handle 50 is generally U-shaped in cross-section and includes a base plate 66 with a pair of depending flanges 64. The handle has a front end 54, a back end 55, an exterior surface 56, and an interior surface 57.

The base plate 66 has a slot 68 formed therethrough for receiving a trigger lock 58. The plate also includes an angled wall 70, near the front end 54 of the handle, adjacent the slot.

The flanges 64 of the handle 50 are spaced apart by the base plate 66 and are parallel to each other. Each flange has formed therethrough an aligned kidney slot 72 and an aligned hook mounting hole 74 adjacent the back end 55 of the handle. Each kidney slot has a first end 220 and a second end 222. Each flange also has formed therethrough an aligned biasing rivet mounting hole 169, an aligned trigger lock mounting hole 154, and an aligned sensor mounting hole 182. A pair of rivets 80 mount an angle bracket 78 to the interior surface 57 of the handle at the back end.

The hook 46 is pivotally connected to the handle 50. The hook includes a central body portion 102 having a base portion 100 at one end and a hooked end 104 at the other. The body portion includes an anchor pin 108 extending transversely therethrough. The anchor pin cooperates with the trigger lock 58. The base portion 100 includes a slot 110 extending axially inward and transversely extending aligned holes 112. The base portion also includes a transversely extending stop 114 located adjacent to the end 116 of the base portion. In the embodiment shown in FIG. 3, the stop is a roller pin. The end of the base portion also has an edge 118.

The trigger lock 58 is pivotally mounted to the handle and is used to open and close the handle 50. The trigger lock is adapted to fit within the slot 68 of the handle. The trigger lock is generally U-shaped in cross section having a base plate 146 conforming to the shape of the slot and a pair of depending flanges 140 terminating in hooked back ends 142 with angled surfaces 144. The depending flanges are spaced apart by the base plate and are parallel to each other extending perpendicularly from the plate. Each depending flange has formed therethrough an aligned flange hole 156. As shown in FIG. 2, the trigger lock has a locked position in which the trigger lock engages the anchor pin 108 of the hook 46 locking the handle in the closed position.

The trigger lock 58 also includes a generally U-shaped bracket 147 having a plate 148 and a pair of side walls 149. The side walls are spaced apart by the plate and extend perpendicularly and rearwardly from the plate. Each side wall has formed therethrough an aligned bracket hole 157. As shown in FIG. 2, the bracket is positioned between the depending flanges 140 of the trigger lock such that the plate is angled downwardly from the base plate 146 of the trigger lock. Preferably, the bracket is spot welded to the depending flanges.

A trigger mounting rivet 150 pivotally mounts the trigger lock 58 to the handle 50. The trigger rivet extends through the aligned trigger lock mounting holes 154 of the trigger lock, the aligned flange holes 156 of the trigger lock, and the aligned bracket holes 157 such that the trigger lock pivots between a flush position and an angled position relative to the handle. A bushing 158 surrounds the trigger rivet and spacers 160 surround the trigger rivet between the depending flanges 140 of the trigger lock and the flanges 64 of the handle. A spring 162 biases the trigger lock towards a flush position relative to handle. As shown in FIG. 2, the spring is coiled about the bushing of the trigger rivet between the depending flanges of the trigger lock. The spring bears against the interior surface 163 of the base plate 146 of the trigger lock and against a biasing rivet 166 which is mounted through the aligned biasing rivet mounting holes 169. Also, a bushing 168 surrounds the biasing rivet.

A mounting bolt 38 rotatably mounts the handle 50 to the first cowling 24. The mounting bolt extends transversely through the aligned kidney slots 72 in the handle and connects to a linkage 52.

The linkage 52 rotatably mounts the hook 46 to the mounting bolt 38 and pivotally connects the hook to the handle 50. The linkage includes a pair of links 82 and a hook mounting rivet 128. The links are parallel to one another and each includes a first end 84 with an aligned hole 86 formed therethrough and a second end 88 with an aligned hole 90 formed therethrough. The aligned holes in the links receive the mounting bolt which extends transversely therethrough. A bushing 94 surrounds the mounting bolt and a spacer 96 is interposed between the links. A fastener, such as the hook mounting rivet, pivotally connects the hook to the handle. The hook mounting rivet extends transversely though the aligned hook mounting holes 74 in the handle, the aligned holes 90 in the links, and the aligned holes 112 in the hook. A spacer 132 (as shown in FIG. 2) surrounds the hook mounting rivet within the slot 110 of the hook. As best seen in FIG. 2, when the latch is closed, the axis of the hook mounting rivet 128 is located over a cross-sectional line 133 between the axis of the keeper bar 42 and the axis of the mounting bolt 38 thereby creating an overcenter or toggle position.

A spring 134 biases the handle in a clockwise direction. As shown in FIG. 2, the spring is coiled about the spacer 132 of the hook mounting rivet 128 and is located within the slot 110 of the hook 46. The spring 134 compresses when the handle 50 is in the closed position. The spring bears against the interior surface 57 of the handle and against the stop 114 biasing the handle in a clockwise direction relative to the hook mounting rivet.

The latch 20 includes a sensor 60 mounted on the handle 50 having a sensing end 172 for engagement with the keeper and a blocking end 171 for engagement with the trigger lock 58. The sensor includes a blocking wall 174, at the blocking end, and two depending legs 178. The depending legs are spaced apart by the blocking wall and are parallel to each other and angle away from the blocking wall. Each depending leg has formed therethrough an aligned leg hole 184. An edge 200 of each leg defines the sensing end. As shown in FIG. 2, the depending legs straddle the hooked end 104 of the hook when the handle is in the closed position. A pivot pin 180 pivotally mounts the sensor to the handle. The pivot pin extends through the aligned sensor mounting holes 182 of the handle and through the aligned leg holes of the sensor. A coiled torsional spring 190 is coiled about the pivot pin 180 between the depending legs. As shown in FIG. 2, a leg 192 of the spring bears against the angled wall 70 of the plate 66 biasing the sensor towards the trigger lock. The sensor has a blocking position which prevents the handle from closing when the hook 46 does not engage the keeper and an unblocking position allowing the handle to close when the hook does engage the keeper.

The method of use and operation of the latch 20, constructed as described above, proceeds as follows.

With particular reference to FIG. 2, when the latch 20 is properly closed, the handle 50 is in the closed position such that the exterior surface 56 of the handle is flush with the exterior surface 53 of the first cowling 24. The trigger lock 58 is in the locked position in which the hooked ends 142 of the trigger lock engage the ends of the anchor pin 108 of the hook 48 securing the handle in the closed position. The hook engages the bar 42 of the keeper 40, securing the cowlings 24 and 26 together, and the sensor 60 is in the unblocking position.

In the unblocking position, the edges 200 of the depending legs 178 abut the bar 42 of the keeper 40 such that the sensor 60 opposes the action of the spring 190. The blocking wall 174 of the sensor is rotated away from the angled wall 148 of the bracket 147, so that the blocking wall of the sensor does not push against the trigger lock 58. Therefore, the hooked ends 142 of the trigger lock can engage the anchor pin 108 such that the handle 50 overcomes the spring action of the spring 134 and can close. Thus, when the handle rotates to the closed position and the hook 46 properly engages the keeper, the sensor is positioned away from the trigger lock such that the sensor allows the handle and the trigger lock to close, providing a visual indication that the latch is properly closed.

Figure 4A:
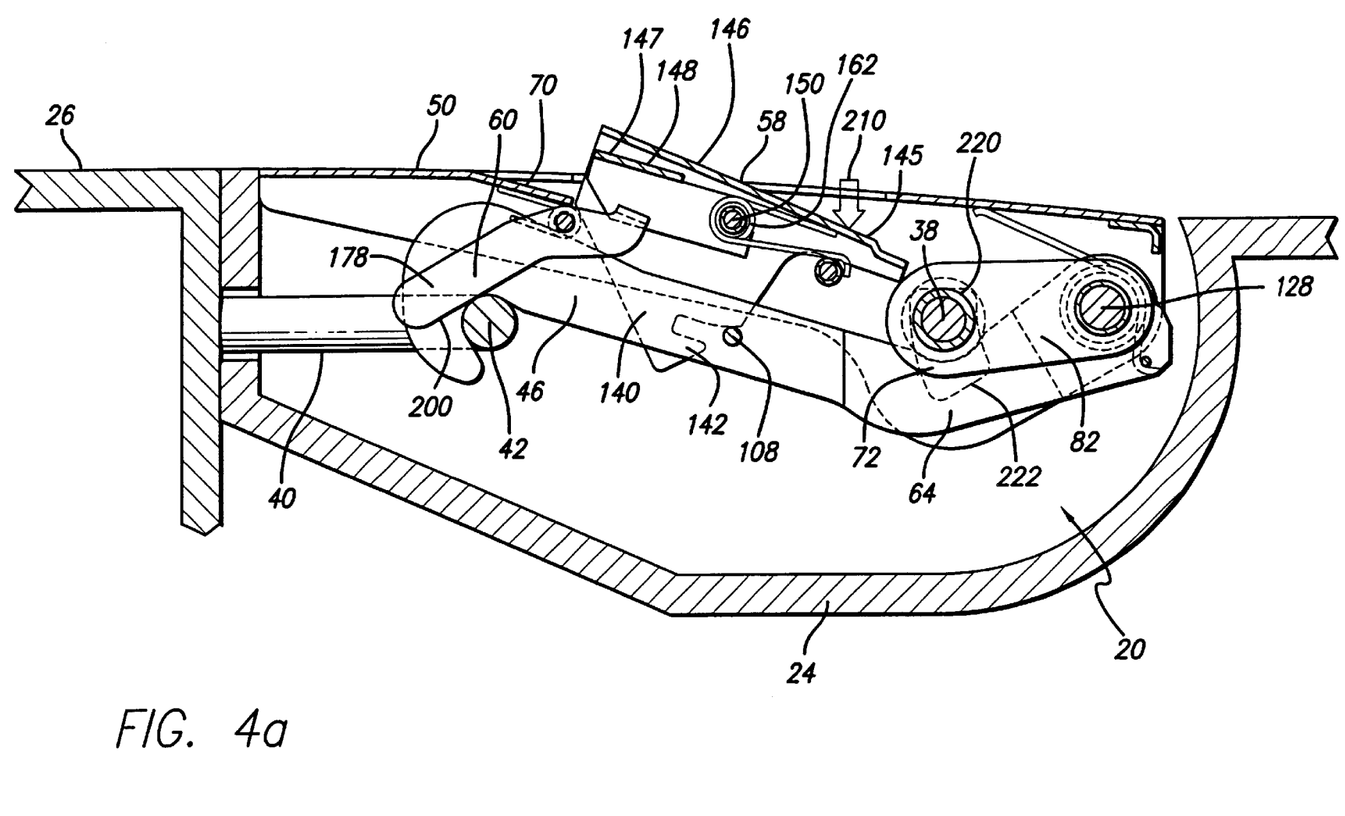
FIG. 4a is a sectional view of the latch, illustrating the initial opening of the latch from the closed position of FIG. 2.

FIG. 4a is a sectional view of the latch 20 and illustrates the initial opening of the latch. The latch is opened by pushing the base plate 146 of the trigger lock 58 to a position 210 (indicated by an arrow), in opposition to the action of the spring 162. The trigger lock pivots clockwise relative to the trigger rivet 150 and assumes an angled position relative to the handle 50. As the trigger lock pivots to the angled position, the hooked ends 142 of the trigger lock disengage from the anchor pin 108 of the hook 46. Alternatively, the latch can be opened by inserting a screwdriver along the angled wall 70, underneath the base plate of the trigger lock, and prying the trigger lock open. The bracket 147 advantageously acts as a shield to prevent the screwdriver from extending to far into the latch and damaging the internal components of the latch.

Figure 4B:
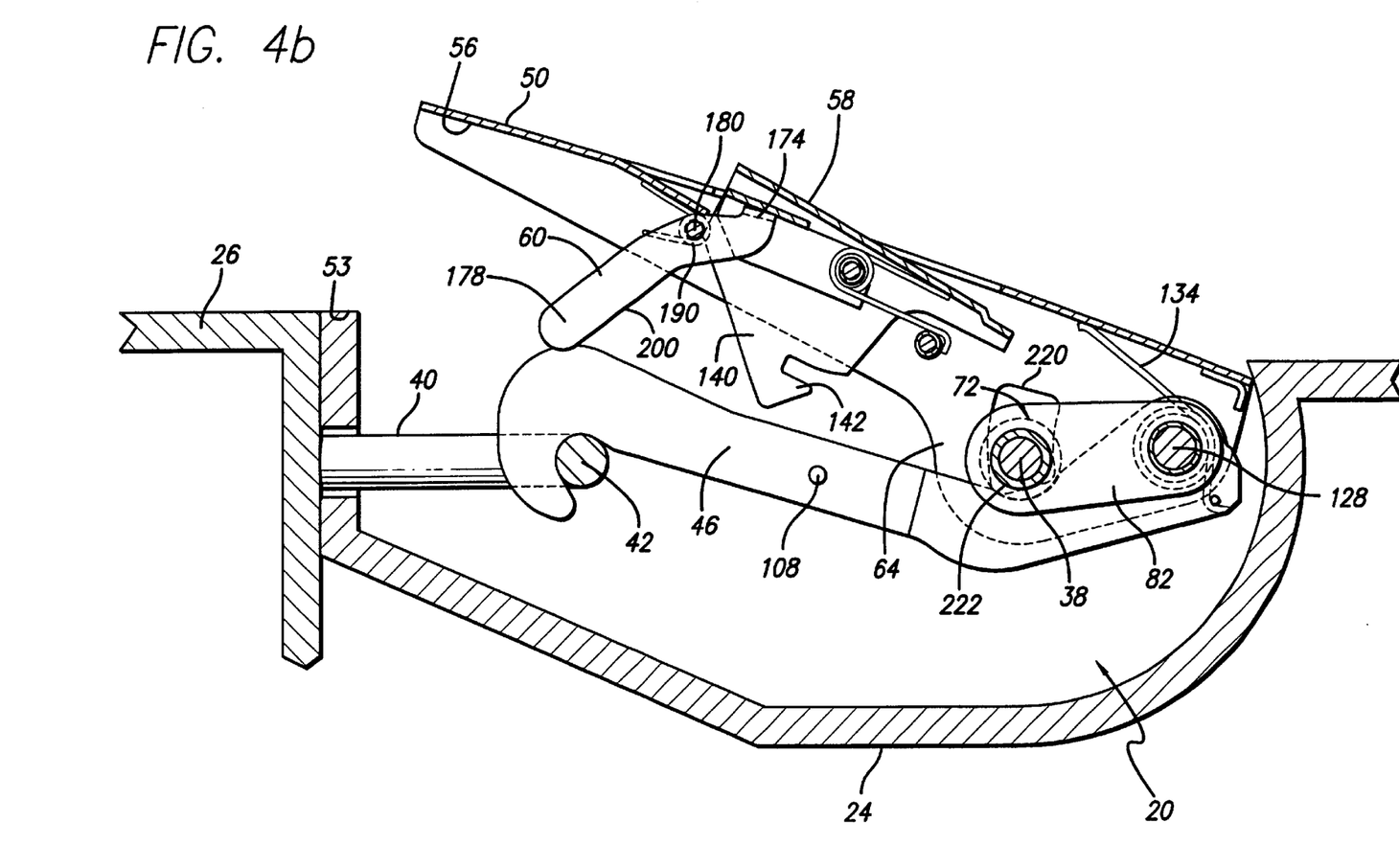
FIG. 4b is a sectional view of the latch, illustrating the latch moved from the position of FIG. 4a to a partially open position.

FIG. 4b is a sectional view of the latch 20 and illustrates the latch in the partially open position. After the hooked ends 142 of the trigger lock 58 disengage from the anchor pin 108 of the hook 46, the action of the spring 134 assists the handle 50 in rotating clockwise about the hook rivet 128 such that the handle can be easily rotated out of the first cowling 24. The kidney slots 72 allow the clockwise rotation of the handle to approximately 15±2–5 degrees without actuating the hook or the links 82 thereby maintaining the latch in the overcenter or toggle position. The kidney slots move from a point where the mounting bolt 38 abuts the first ends 220 (as shown in FIG. 4a) to a point where the mounting bolt abuts the second ends 222 (as shown in FIG. 4b). Also, the edges 200 of the depending legs 178 of the sensor 60 no longer abut the bar 42 of the keeper 40. Thus, the spring 190 is free to bias the sensor counter-clockwise relative to the pivot pin 180 against the trigger lock. The blocking wall 174 pushes against the trigger lock such that the trigger lock is angled relative to handle while the handle is open. The handle is now in the partially open position and can thereafter be manually rotated to bring the latch out of the overcenter or toggle position and into the fully open position.

Figure 4C:
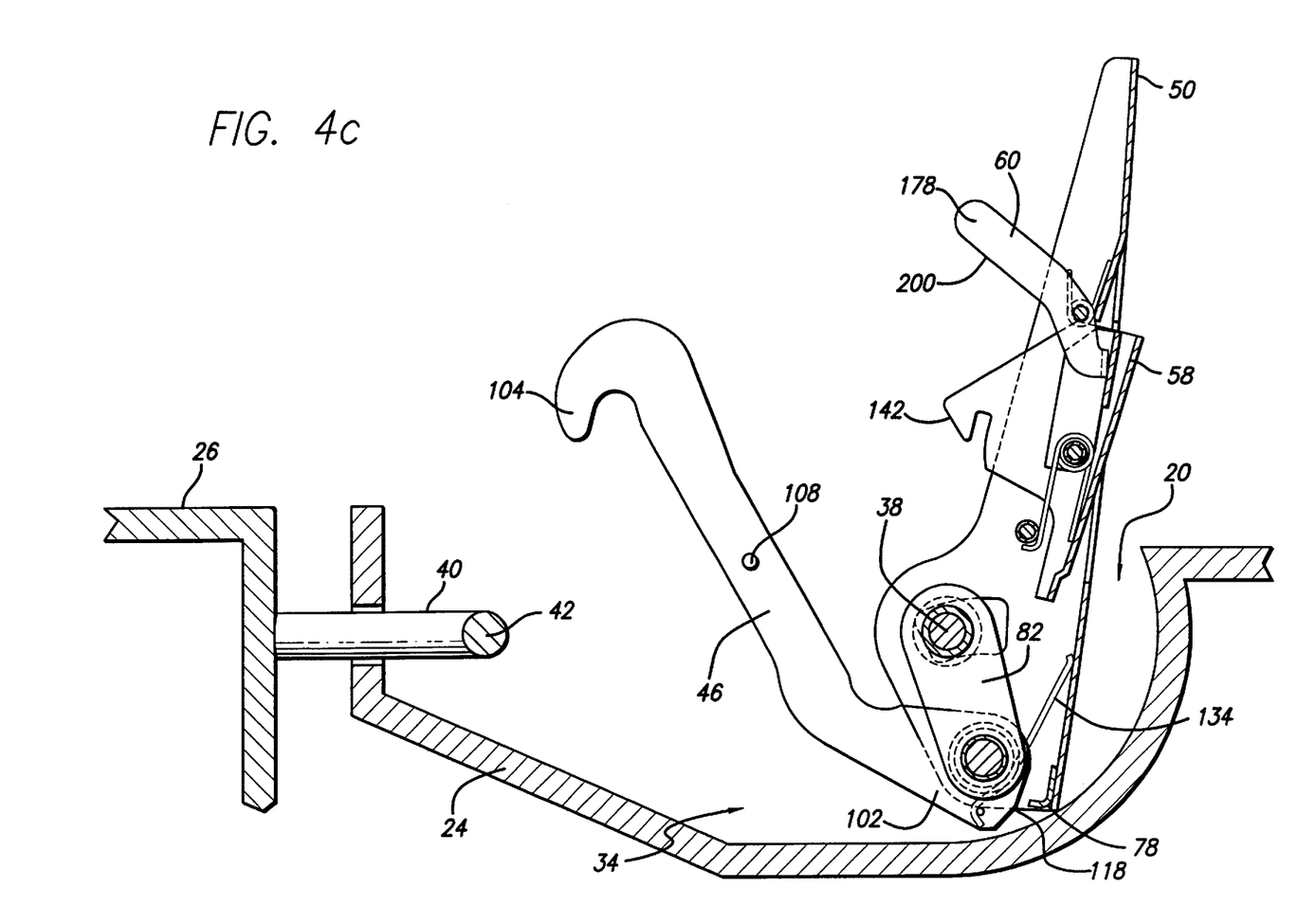
FIG. 4c is a sectional view of the latch, illustrating the latch moved from the position of FIG. 4b to a fully open position.

FIG. 4c is a sectional view of the latch 20 and illustrates the latch in the fully open position. After the spring 134 forces the handle 50 out of the first cowling 24, the latch can be opened, from the partially open position shown in FIG. 4b, to the fully open position by pulling the handle away from the first cowling. As the handle is pulled away from the first cowling, the handle, the links 82, and the hook 46 rotate clockwise relative to the mounting bolt 38 and into the aperture 34. The handle forces the angle bracket 78 to push against the edge 118 of the hook, forcing the hooked end 104 away from the bar 42 of the keeper 40 such that the hook disengages from the bar. The cowlings 24 and 26 are no longer secured to one another and can be opened.

After the cowlings 24 and 26 have been closed they are secured by the use of the latch 20. The process by the which latch properly closes is simply the reverse of the previously described process. As best seen in FIG. 4a, as the handle 50 pivots towards its closed position, the hooked end 104 of the hook 46 engages the bar 42 of the keeper 40. Also, the edges 200 of the depending legs 178 of the sensor 60 engage the bar such that the sensor rotates to the unblocking position. During the further rotation of the handle, the hooked ends 142 of the trigger lock 58 engage the anchor pin 108 of the hook such that the handle closes.

In the closed position, as best seen in FIG. 2, the exterior surface 56 of the handle is flush with the exterior surface 53 of the first cowling indicating that the latch is properly closed and the cowlings are secure.

Figure 4D:
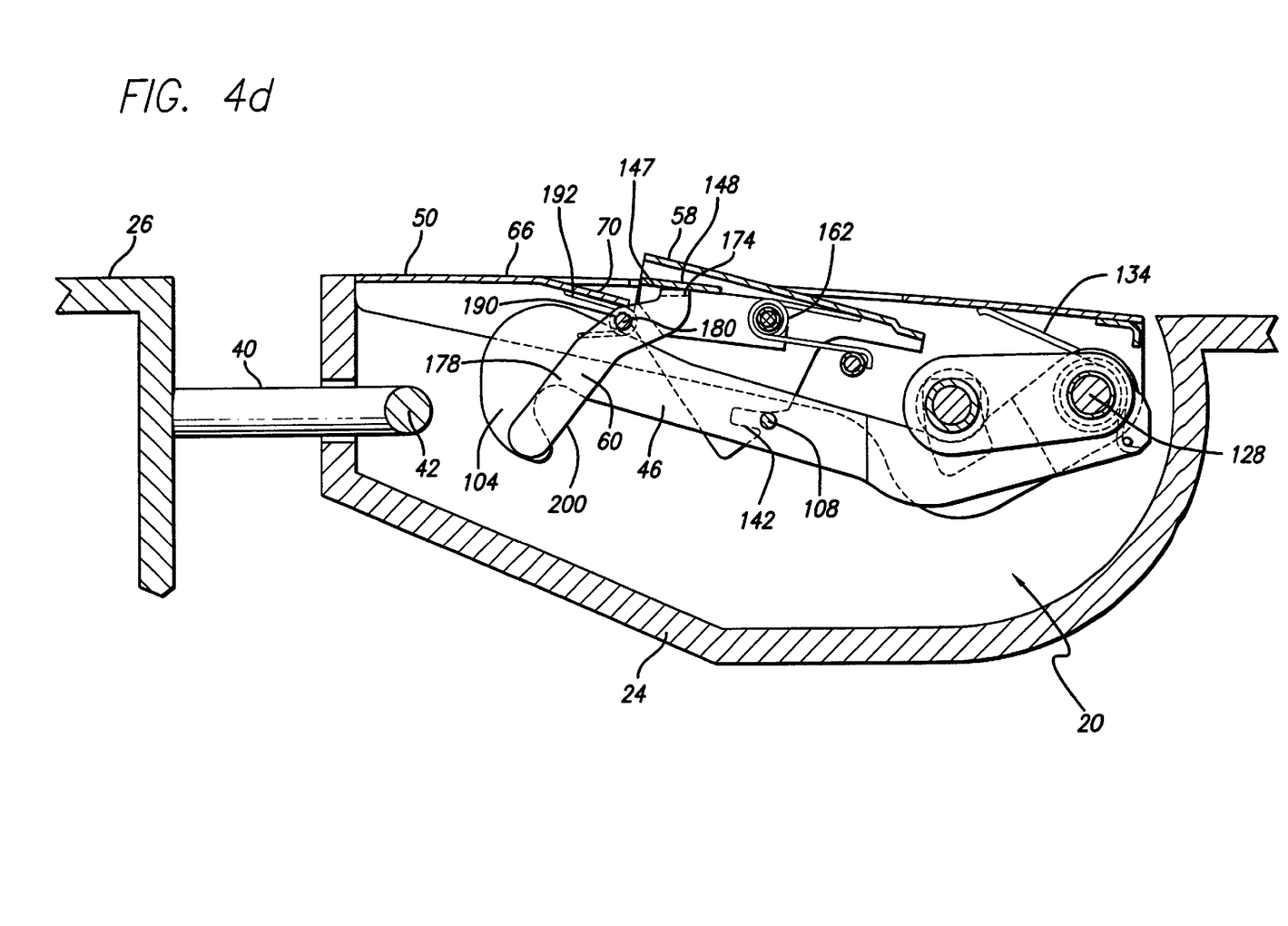
FIG. 4d is a sectional view of the latch disengaged from the keeper, showing the latch moved towards the closed position of FIG. 2, and illustrating the sensor in a blocking position.

FIG. 4d is a sectional view of the latch 20 disengaged from the keeper 40 and illustrates the sensor 60 in the blocking position. If the handle 50 is pivoted to its closed position, and the hook 46 and the sensor do not engage the bar 42 of the keeper, the sensor prevents the handle from closing. When the edges 200 of the depending legs 178 do not engage the bar, the spring 190 biases the sensor to the blocking position. The spring biases the blocking wall 174 flush against the angled wall 148 of the bracket 147. The blocking wall pushes against the trigger lock 58, overcoming the action of the spring 162, such that the trigger lock is angled relative to the handle. The angled position of the trigger lock prevents the hooked ends 142 from engaging the anchor pin 108 of the hook. The action of the spring 134 then forces the handle to rotate clockwise to the partially open position and out of first cowling 24 as shown in FIG. 4b. Thus, the exterior surface 56 of the handle is not flush with the exterior surface 53 of the first cowling providing a visual indication that the latch is not properly closed and the cowlings are not secure.

The sensor ensures that when the handle is closed, the keeper is properly engaged, and that the cowlings are secure. On the other hand, when the latch does not close properly, the handle pivots away from the exterior surface of the cowling providing a visual indication that the latch is not properly closed. Accordingly, the latch provides a visual indication, via the position of the handle, of the state of engagement of the hook and the keeper. Another advantage of the latch is that the sensor is pivotally mounted to the handle, instead of the hook, so that the sensor has no effect on the flight load capabilities of latch. Thus, the latch can accommodate larger flight loads. Also, the sensor can be added to currently existing latches by simply mounting the sensor to the handle. Additionally, the sensor is relatively light in weight and simple in design.

Those skilled in the art will recognize that other modifications and variations can be made in the latch with sensor of the invention and in the construction and operation of the latch without departing from the scope or spirit of this invention. For example, it should be understood that this device could also be used to secure a variety of different panels on various types of structures. With such possibilities in mind, the invention is defined with reference to the following claims.

I claim:

1. A latch with sensor for releasably engaging a keeper, the latch comprising:

a handle moveable between a closed position and an open position;

a hook pivotally connected to the handle for engagement with the keeper;

a trigger lock pivotally mounted to the handle so that when the handle is in the closed position, the trigger lock is disengaged from the hook, and when the handle is in the open position, the trigger lock is disengaged from the hook;

a sensor having a sensing end and a blocking end;

the sensor pivotally mounted to the handle generally intermediate the sensing end and the blocking end;

the sensor moveable between a blocking position and an unblocking position;

the sensing end not engaging the keeper and the blocking end engaging the trigger lock when the sensor is in the blocking position for preventing the trigger lock from engaging the hook and the handle from closing; and the sensing end engaging the keeper and the blocking end being located away from the trigger lock when the sensor is in the unblocking position for allowing the trigger lock to engage the hook and the handle to close.

2. The latch of claim 1, wherein the handle includes a pair of opposing flanges and the sensor is pivotally mounted to the opposing flanges of the handle.

3. The latch of claim 1 further comprising a bracket mounted to the interior of the trigger lock for engagement by the sensor.

4. A latch with sensor for releasably engaging a keeper, the latch comprising:

a handle including a pair of opposing flanges moveable between a closed position and an open position;

a hook pivotally connected to the handle for engagement with the keeper, the hook having a transversely extending anchor pin;

a trigger lock having two flanges with hooked ends, the trigger lock pivotally mounted to the opposing flanges of the handle so that when the handle is in the closed position, the hooked ends engage the anchor pin of the hook, and when the handle is in the open position, the hooked ends are disengaged from the anchor pin of the hook; and a sensor having a blocking wall and two depending legs pivotally mounted to the opposing flanges of the handle by a pivot pin and a spring with two legs, the sensor moveable between a blocking position and an unblocking position, the spring coiled about the pivot pin with one of the legs of the spring bearing against the handle biasing the blocking wall towards the trigger lock such that, in the blocking position, the depending legs do not engage the keeper and the blocking wall is biased by the spring against the trigger lock thereby preventing the hooked ends of the trigger lock from engaging the anchor pin of the hook and the handle from closing, and, in the unblocking position, the depending legs engage the keeper rotating the sensor against the action of the spring and positioning the blocking wall away from the trigger lock thereby allowing the hooked ends of the trigger lock to engage the anchor pin of the hook and the handle to close.

5. A latch with sensor for releasably engaging a keeper, the latch comprising:

- a handle including a pair of opposing flanges moveable between a closed position and an open position;
- a hook pivotally connected to the handle for engagement with the keeper;
- a trigger lock pivotally mounted to the opposing flanges of the handle so that when the handle is in the closed position, the trigger lock engages the hook, and when the handle is in the open position, the trigger lock is disengaged from the hook; and
- a sensor having a sensing end and a blocking end;
- the sensor being pivotally mounted to the opposing flanges of the handle;
- a pivot pin extending through the opposing flanges of the handle and through the sensor locating the sensor within the handle and pivotally mounting the sensor to the handle;
- the sensor being moveable between a blocking position and an unblocking position;
- the sensing end not engaging the keeper and the blocking end engaging the trigger lock when the sensor is in the blocking position for preventing the trigger lock from engaging the hook and the handle from closing; and
- the sensing end engaging the keeper and the blocking end being located away from the trigger lock when the sensor is in the unblocking position for allowing the trigger lock to engage the hook and the handle to close for allowing the trigger lock to engage the hook and the handle to close.

6. The latch of 5, further comprising a spring having two legs coiled about the pivot pin with one of the legs bearing against the handle biasing the blocking end of the sensor towards the trigger lock.

7. The latch of claim 6, wherein the sensor includes a blocking wall and two depending legs.

8. The latch of claim 7, wherein if the depending legs of the sensor do not engage the keeper, the blocking wall of the sensor is biased by the spring against the trigger lock preventing the trigger lock from engaging the hook and the handle from closing.

9. The latch of claim 7, wherein if the depending legs of the sensor engage the keeper, the sensor is rotated by the contact with the keeper against the action of the spring so that the blocking wall of the sensor is positioned away from the trigger lock allowing the trigger lock to engage the hook and the handle to close.

10. The latch of claim 7 further comprising a bracket mounted to the interior of the trigger lock for engagement by the sensor.

* * * * *